Jan. 18, 1966   D. E. WILCOX ETAL   3,229,530
ACCELEROMETER
Filed Dec. 12, 1960   5 Sheets-Sheet 2

*INVENTORS*
DOYLE E. WILCOX
WILLIAM D. MULLINS JR.
BY
Ernest L. Brown
ATTORNEY

Jan. 18, 1966 D. E. WILCOX ETAL 3,229,530
ACCELEROMETER
Filed Dec. 12, 1960 5 Sheets-Sheet 3

INVENTORS
DOYLE E. WILCOX
WILLIAM D. MULLINS JR.
BY
Ernest L Brown
ATTORNEY

INVENTORS
DOYLE E. WILCOX
WILLIAM D. MULLINS JR.
BY
Ernest L. Brown
ATTORNEY

Jan. 18, 1966    D. E. WILCOX ET AL    3,229,530
ACCELEROMETER

Filed Dec. 12, 1960    5 Sheets-Sheet 5

*INVENTORS*
DOYLE E. WILCOX
WILLIAM D. MULLINS JR.
BY
Ernest L. Brown
ATTORNEY

United States Patent Office 3,229,530
Patented Jan. 18, 1966

3,229,530
ACCELEROMETER
Doyle E. Wilcox, La Puente, and William D. Mullins, Jr., Downey, Calif., assignors to North American Aviation, Inc.
Filed Dec. 12, 1960, Ser. No. 75,441
20 Claims. (Cl. 73—517)

This invention pertains to means for detecting acceleration, and more particularly to a capacitive accelerometer.

It is necessary in an age of rapid transportation continuously to increase the accuracy and reliability of accelerometers. Prior known accelerometers appear to have reached their accuracy and reliability limit. To the end of producing a more accurate and reliable accelerometer, the capacitive accelerometer of this invention has been conceived.

Coincident with the construction of an improved accelerometer, subcombinations comprising improved pickoffs and force generating means have been conceived.

It is contemplated that the accelerometer of this invention may be utilized as a force sensing means.

This invention further contemplates two movable, mechanically connected electrodes; means for creating two separate electric fields, differentially polarized with respect to the direction of displacement of the electrodes; sensing means connected to the electrodes to detect displacement of the electrodes relative to the fields; and means for forcing the electrodes into a neutral position in response to signals from the sensing means.

More particularly the device of this invention utilizes a pair of oppositely directed electrical fields with a separate electrode positioned in each field and with the separate electrodes mechanically connected together to be utilized to sense motion of the connected electrodes and to cooperate with the electric fields to apply force to the connected electrodes.

It is therefore an object of this invention to sense acceleration.

It is another object of this invention to sense force.

It is still another object of this invention to sense displacement.

It is also an object of this invention electrostatically to generate a predetermined force.

It is a more particular object of this invention to sense accelerations by utilizing a mass, connected to a pair of electrodes positioned in differentially directed electric fields to generate a signal which is a measure of the displacement of the mass, and to use the sensed signal to generate a force to return the mass to a neutral position.

Still more particularly it is an object of this invention to sense the displacement of a mass by means of a pair of electrodes, connected to the mass, positioned in differentially directed electric fields to generate electrical signals which are a measure of the displacement of the mass from a neutral position, to generate electrical signals, and to apply the electrical signals to the aforesaid electrodes to generate electrostatic forces which return the mass to its neutral position. In such an arrangement amplifying means are provided which generate an electrical signal which is a measure of the acceleration experienced by the mass.

These and other objects of the invention will become apparent from the following description taken in connection with the accompanying drawings, in which.

Figure 1:
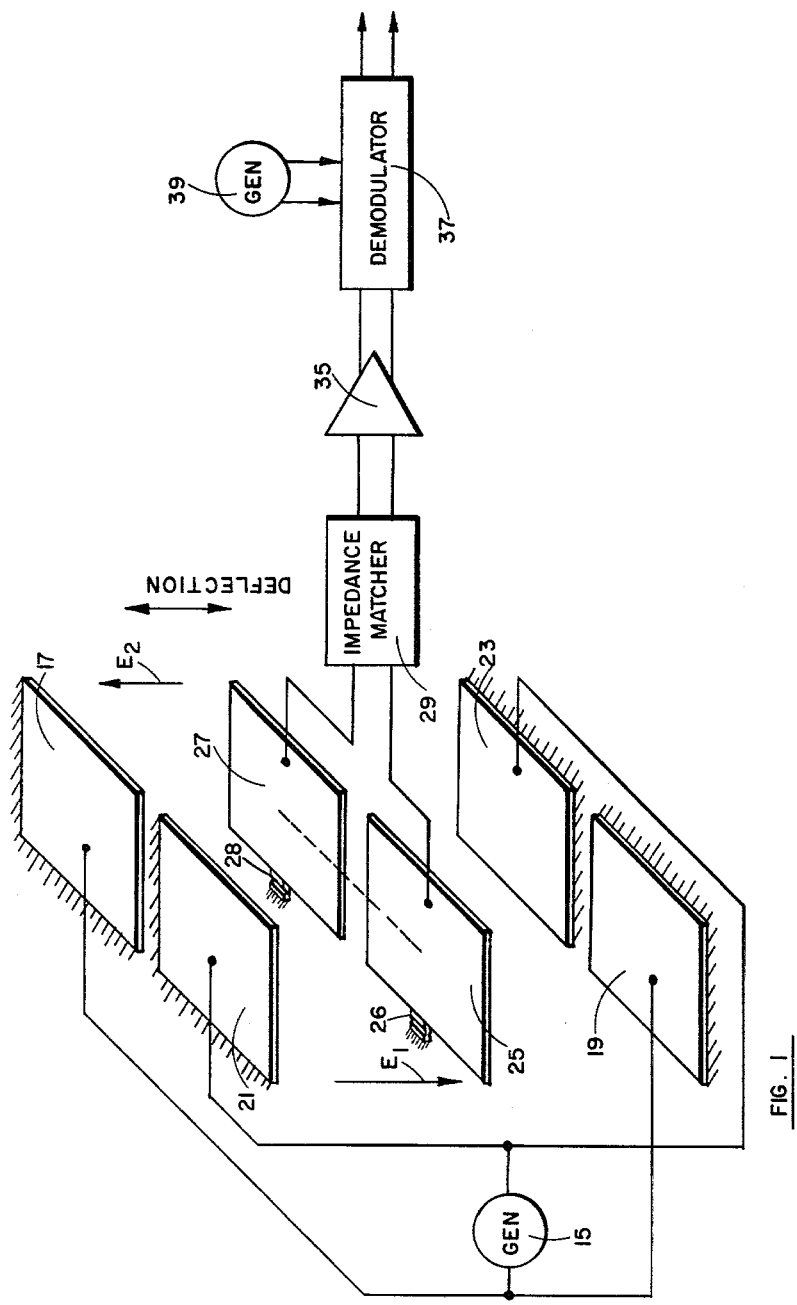
FIG. 1 is a schematic of a device of this invention utilized to detect displacement of a pair of electrodes positioned in differentially directed electrical fields.

FIG. 1 shows a pair of mechanically-connected displaceable electrodes 25 and 27, hinged at hinges 26 and 28, and positioned in a pair of differentially directed electrical fields E1 and E2 to generate a voltage between electrodes 25 and 27 which is a measure of the deflection of electrodes 25 and 27 from a predetermined neutral position. Alternating voltage source 15 is connected by one terminal to electrodes 17 and 19 and by the other terminal to electrodes 21 and 23 to generate alternating differentially directed electrical fields E1 and E2.

The capacitive device of electrodes 17, 19, 21, 23, 25, and 27 may be characterized as a capacitive bridge with an alternating voltage source 15 connected across its input and impedance matcher 29 connected across its output.

Electrodes 25 and 27 are connected through impedance matcher 29, amplifier 35 and demodulator 37 to generate a direct signal which is a measure of the deflection of electrodes 25 and 27 from a neutral position. Alternating voltage source 39 has the same frequency and phase as alternating voltage source 15 and is preferably a separate winding on the same transformer as voltage source 15.

In the preferred embodiment of this invention fixed electrodes 17, 19, 21 and 23 are identical, electrodes 19 and 23 are parallel to electrodes 21 and 17, electrode 19 is aligned with electrode 21, and electrode 17 is aligned with electrode 23. To say that electrodes 19 and 21 are aligned means that if a line is erected from each corner of electrode 19 perpendicular to the plane of electrode 19, it intersects the corresponding corner of electrode 21.

Figure 2:
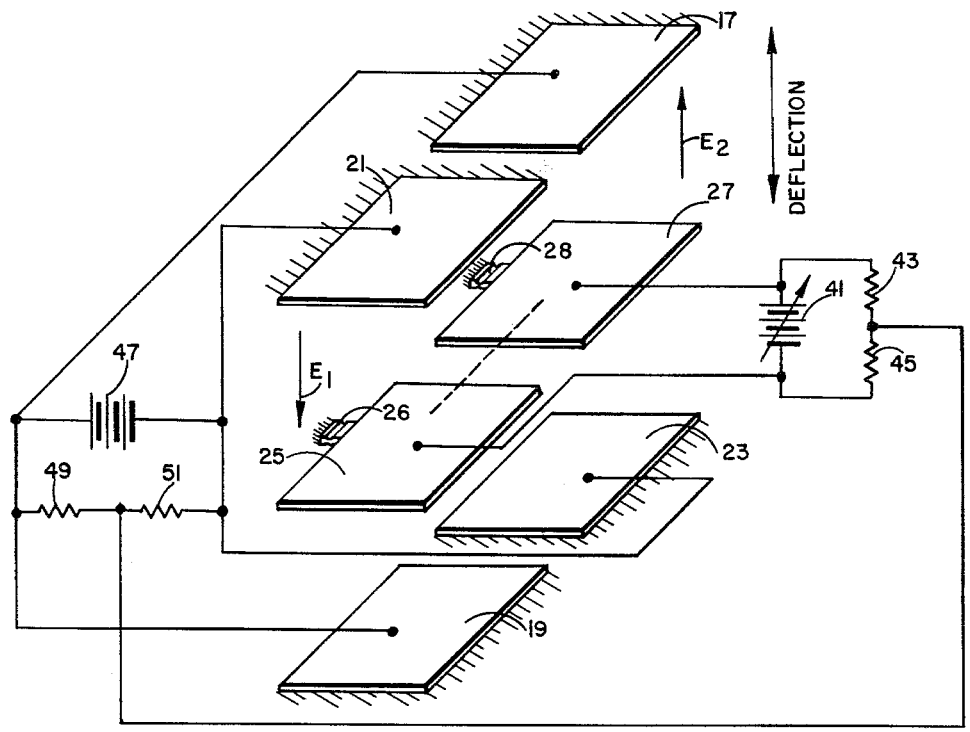
FIG. 2 is a schematic of a means for applying electrostatic forces to a pair of electrodes positioned in differentially directed electrostatic fields.

FIG. 2 shows a pair of mechanically-connected displaceable electrodes 25 and 27, hinged at 26 and 28, and positioned in differentially directed electrical fields E1 and E2 to generate a force on electrodes 25 and 27, by interaction with electric fields E1 and E2. A direct voltage source 47 is connected by one terminal to electrodes 17 and 19 and by the other terminal to electrodes 21 and 24 to generate differentially directed electrical fields E1 and E2. A voltage dividing network comprising equal resistance members 49 and 51 is connected across voltage source 47. A variable voltage source 41 is connected between moveable plates 25 and 27. The center tap between resistance members 49 and 51 is electrically connected to the center tap between equal resistance members 43 and 45 which are connected across voltage source 41.

In both the devices of FIGS. 1 and 2, moveable plates 25 and 27 may be cantilevered, or the like, as described more completely in connection with the embodiments of FIGS. 5 through 11. Electrodes 17, 19, 21 and 23 are stationary.

Figure 3:
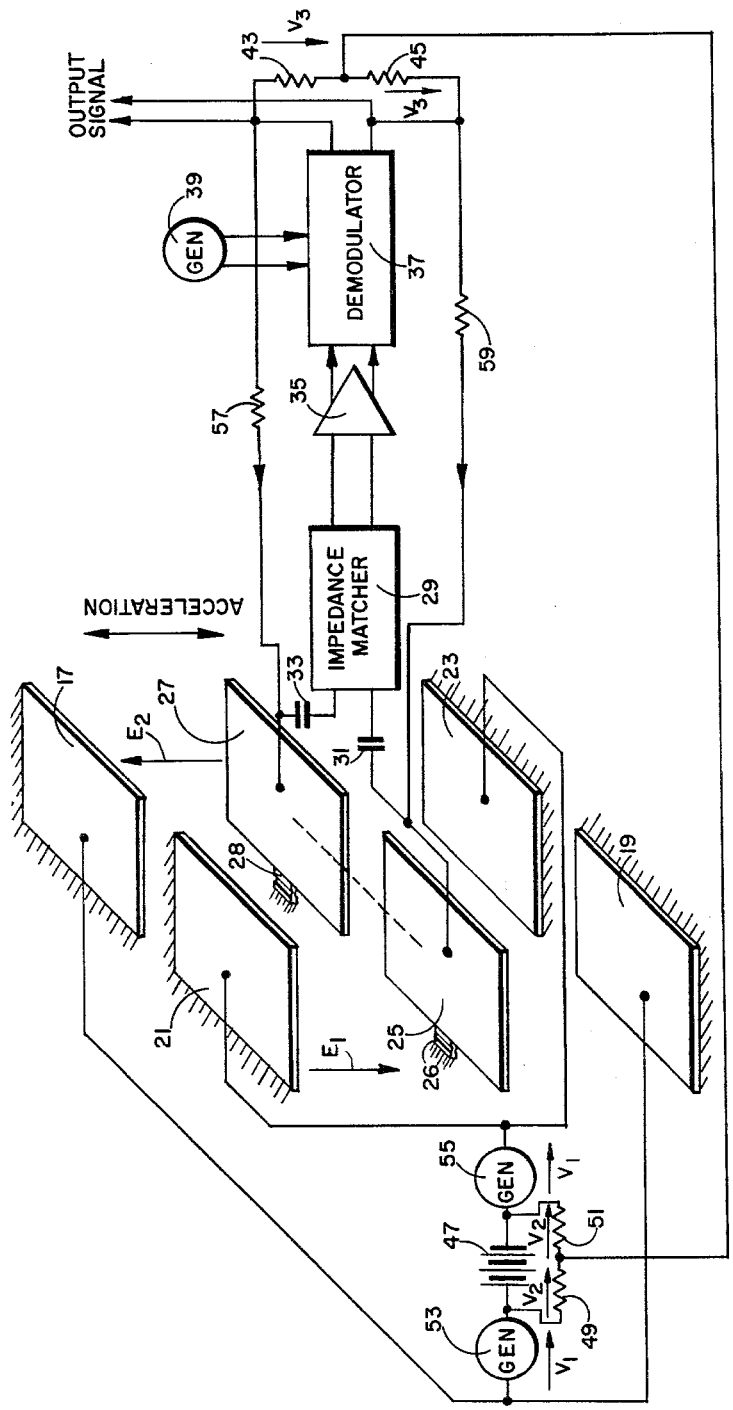
FIG. 3 is a schematic of a pair of electrodes positioned in superimposed alternating and constant differentially directed electrical fields adapted to detect acceleration.

In FIG. 3, electrodes 25 and 27 are mechanically connected to be displaced together in differentially directed electrical fields E1 and E2 to cause voltage sensed between electrodes 25 and 27 to be a measure of the displacement of electrodes 25 and 27 from a neutral position and the voltage applied between electrodes 25 and 27 to generate a force upon electrodes 25 and 27.

Voltage source 47 is connected in series with alternators 53 and 55. One terminal of the series combination is connected to stationary electrodes 17 and 19 while the other terminal of the series combination is connected to stationary electrodes 21 and 23 to generate differentially directed electric fields E1 and E2. Displaceable electrodes 25 and 27 are connected through a high pass filter network such as alternating signal coupling condensers 31 and 33—preferably through impedance matcher 29—, and through amplifier 35 and demodulator 37 to generate a voltage at the output of amplifying means 35 and demodulator 37. The frequency and phase of the voltage of alternator 39 is the same as the frequency and phase of the voltage of alternators 53 and 55. In a preferred embodiment of this invention, alternator 39 is merely an additional winding connected to a common transformer with alternating voltage sources 53 and 55. Equal resistors 49 and 51 are connected across voltage source 47, and equal resistors 43 and 45 are connected across the output of demodulator 37. The center tap between resistors 49 and 51 is electrically connected to the center tap between resistors 43 and 45. The electrical output of demodulator 37 is connected, through a low pass filter network such as decoupling resistors 57 and 59, to electrodes 25 and 27.

The differentially directed electrical fields E1 and E2 in FIG. 3 have two separate frequency components: a first component at a first frequency which is utilized to generate a signal which is a measurement of displacement of the moveable electrodes, and a second component at a second frequency which is utilized to apply force to the moveable electrodes. The electrical network attached to the moveable electrodes is adapted first to separate the two frequency components, to amplify the signal of the first frequency component, to change it to a second frequency and to apply the second frequency signal to the moveable electrodes. In the preferred embodiment of the invention, the second frequency is very low, i.e. at the frequency of applied acceleration.

Figure 4:
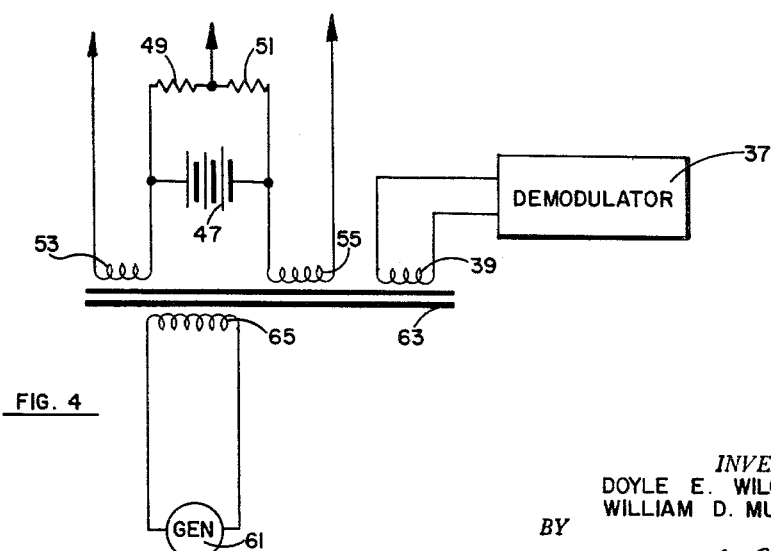
FIG. 4 is a more detailed schematic of a typical means for connecting direct and alternating voltages in series to be utilized to generate superimposed alternating and constant differentially directed electrostatic fields.

One means for causing the frequency and phase of alternators 53, 55 and 39 to be the same is to utilize a transformer with a common primary winding. In FIG. 4, primary winding 65 of transformer 63 is connected to a single alternating energy source 61. Alternating voltage sources 53, 55 and 39 are shown in FIG. 4 as separate secondary windings of transformer 63.

Figure 5:
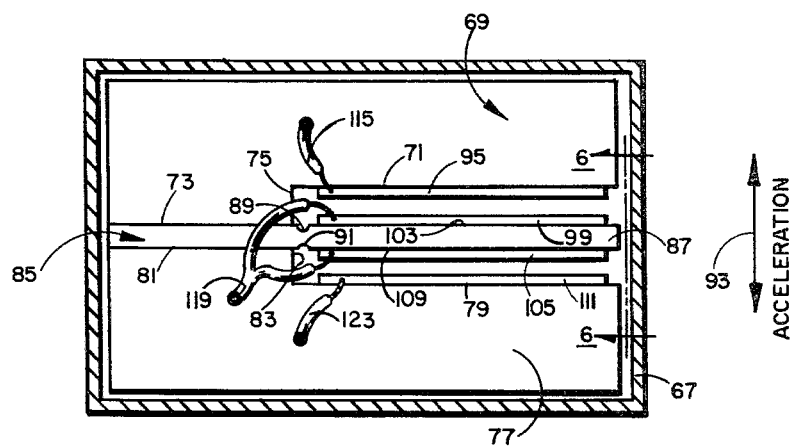
FIG. 5 is a side view, partially in section, of a first embodiment of this invention with the surrounding electrostatic shield in section.
Figure 6:
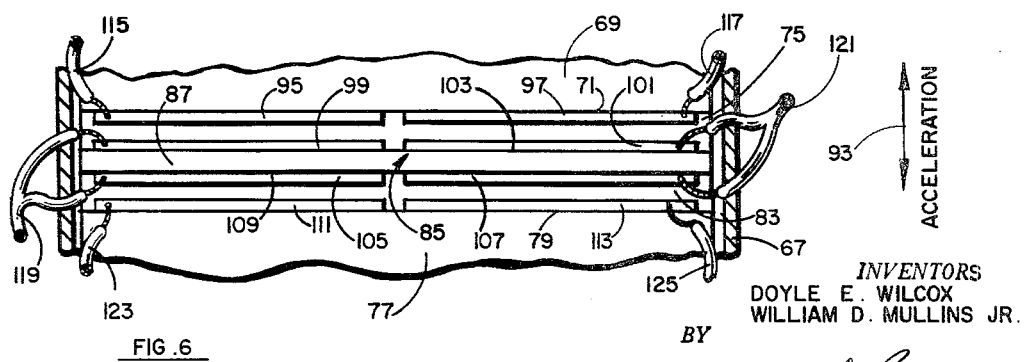
FIG. 6 is a second view, taken at 6—6 in FIG. 5.

A first embodiment of a typical physical structure for a device of this invention appears in FIGS. 5 and 6. The capacitive portion of the device of FIGS. 5 and 6 is completely enclosed (except for electrical leads) by a conductive electrostatic shield 67. A dimensionally stable material such as—for example—fused quartz is utilized to support the electrodes.

A first fused quartz member 69 has a least two, stepped, parallel, spaced apart surfaces 71 and 73.

A second dimensionally stable fused quartz member 77 has at least two, stepped, parallel, spaced apart surfaces 79 and 81.

Surfaces 75 and 83 are in a dividing plane which separates surfaces 71 and 73 and surfaces 79 and 81.

A third dimensionally stable fused quartz member 85 has opposing parallel sides which are adapted to adhere to members 69 and 77 in the region of surfaces 73 and 81. The portion 87 of member 85 is cantilevered to have a neutral position, symmetrically disposed relative to a medial plane between surfaces 71 and 79. The portion 87 of member 85 is flexibly hinged—for example—by grooves 89 and 91 to be displaceable in the directions specified by acceleration arrow 93.

Each of surfaces 71, 103, 109 and 79 supports a pair of electrodes. Electrodes 95 and 97 are mounted upon surfaces 71. Electrodes 99 and 101 are mounted upon surface 103. Electrodes 105 and 107 are mounted upon surface 109 of cantilevered portion 87 of member 85. Electrodes 101 and 113 are mounted upon surface 79. It is preferable that electrodes 95, 99, 105, and 111 be the same shape and size and be aligned. It is also preferable that electrodes 97, 101, 107 and 113 be of the same size and shape and be aligned.

In the preferred embodiments of this invention, electrodes 95, 97, 99, 101, 105, 107, 111, and 113 preferably are metallic and are deposited upon the quartz surfaces by a vacuum process, or the like.

In a typical embodiment of the device of FIGS. 5 and 6, the electrodes are each a quarter inch square, the spacing between non-coplanar electrodes when member 85 is in its neutral position is of the order of one thousandth of an inch, and the thickness of each of the electrodes is of the order of one ten thousandth of an inch.

Terminals 115, 117, 119, 121, 123 and 125 are shown, by way of example only, to indicate the manner in which connecting wires might be connected to the electrodes of this invention. The external electrical circuit connections of the device of FIGS. 5 and 6 are identical to that shown in FIGS. 1, 2, 3, and 4.

A second embodiment of this invention is shown in FIGS. 7 through 11. An electrostatic shield 127 completely surrounds the capacitive portion of the device of this embodiment. The second embodiment of the device of this invention is dimensionally stable and fabricated preferably of fused quartz. The electrodes preferably are metallic such as—for example—gold which is vacuum deposited upon the surface of the quartz. Although the profile of the electrodes is shown in the figures, in actual practice the thickness of the electrodes could not easily be observed because of their extreme thinness. In the device of FIGS. 7 through 11, the area of each electrode is of the order of 1/16 of a square inch, the thickness of the electrode is of the order of one ten-thousandth of an inch, and the spacing between the non-coplanar electrodes is of the order of one thousandth of an inch. These figures are shown by way of example only.

The embodiment of FIGS. 7 through 11 is a circularly cylindrical fused quartz structure which is symmetrical relative to a medial plane through member 165, between the planar end surfaces 131 and 149, which utilizes electrodes that are substantially semi-circular, and which is easier to fabricate and which has better spacing control than the embodiment of FIGS. 5 and 6. Surfaces 145 and 163 are parallel planar surfaces which are symmetrically disposed relative to said medial plane.

A pair of annular spacing members 141 and 159, defined by parallel planar surfaces 143, 145, 163, and 161, have an inner radius which is defined by a first right circular cylinder and an outer radius which is defined by a second right circular cylinder. Members 141 and 159 adhere to member 165 on planar surfaces 143 and 161 between said right circular cylinders.

A pair of identical structural members 129 and 147 adhere to spacing members 141 and 159, respectively, on surfaces 135 and 151. A pair of right circular cylinder members 137 and 153 have an external radius equal to the inner radius of spacing members 141 and 159. Members 137 and 153 are positioned internally of and contacting spacing members 141 and 159, respectively. Members 137 and 153 contact end members 129 and 149, respectively. All contacting surfaces between quartz members are maintained by a physical molecular bond, frequently called an optical bond.

Surfaces 135 and 151 are annular surfaces which are symmetrically disposed relative to said medial plane and extend radially between said first and second right circular cylindrical surfaces. The outer surfaces of members 129 and 147 are not critical but are shown in their preferred embodiment wherein they define a right circular cylindrical surface 133 and a pair of planar surfaces 131 and 149.

Figure 11:
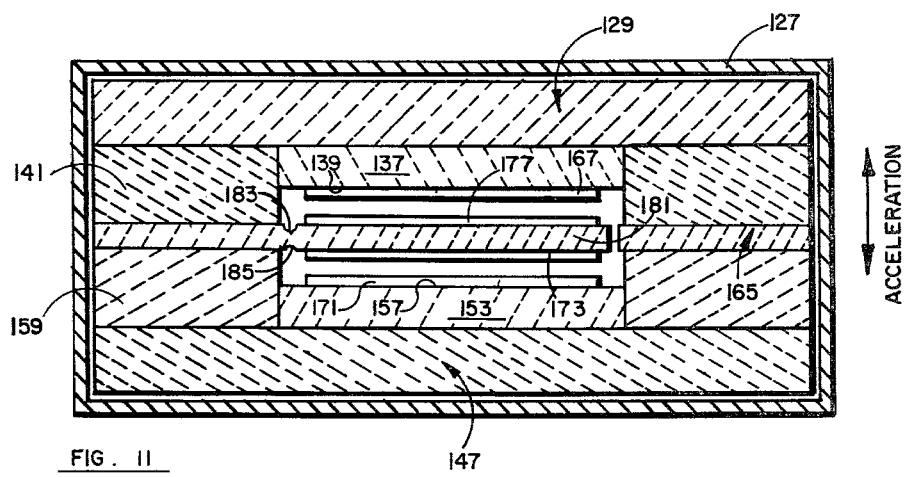
FIG. 11 is a view taken at 11—11 in FIG. 10.
Figure 8:
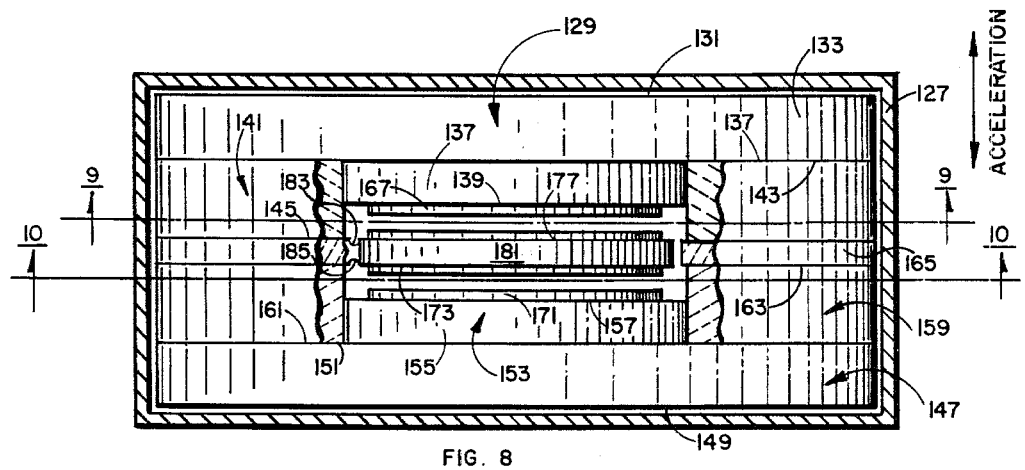
FIG. 8 is a cutaway side view, partially in section and partially in profile, of the device of this invention.
Figure 7:
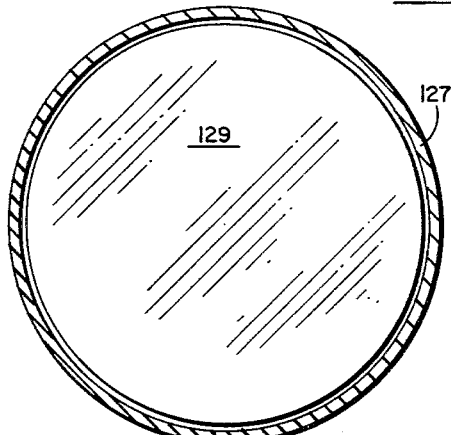
FIG. 7 is an end view of a second and preferred embodiment of this invention with the surrounding electrostatic shielding in section.
Figure 9:
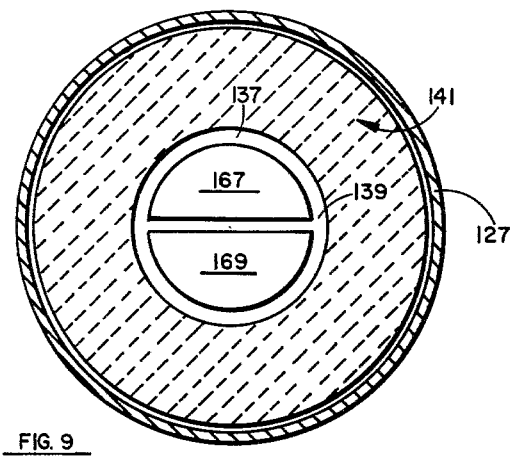
FIG. 9 is a view taken at 9—9 in FIG. 8.

A pair of substantially semi-circular, D-shaped electrodes are positioned on surface 139 of member 137, and a second pair of preferably identical electrodes are positioned on surface 177 of member 165. A third pair of preferably identical electrodes are positioned on surface 173 of member 165, and a fourth pair of preferably identical electrodes are positioned on surface 157 of member 153. Each pair of electrodes are substantially semi-circular in shape with an electrical insulating spacing across one diameter. Electrodes 167 and 169 upon surface 139 are shown in FIG. 9. Electrodes 177 and 178 upon surface 145 of member 165 are shown in FIGS. 8 and 11, respectively. Electrodes 173 and 175 upon surface 163 of member 165 are shown in FIGS. 8 and 11 respectively. Electrodes 171 and 172 upon surface 157 of member 153 are shown in FIGS. 8 and 11, respectively.

Figure 10:
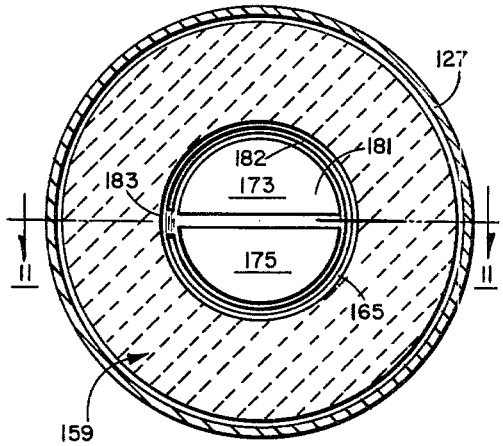
FIG. 10 is a view taken at 10—10 in FIG. 8.

Referring now particularly to FIGS. 10 and 11, member 165 has penetrating therethrough a circularly arced slot 182 which forms a cantilevered member 181 which is hinged relative to the surrounding portion of member 165, at hinge grooves 183 and 185. Electrodes 173, 175, 177, and 178 are mounted on cantilevered portion or reed 181 of member 165.

The operation of the specific embodiments of the capacitive devices of FIGS. 5 through 11 may best be explained by explaining the operation of the devices shown schematically in FIGS. 1 through 4. In FIG. 1 alternator 15 generates a pair of alternating electrical fields E1 and E2 between electrodes 19 and 21 and between electrodes 17 and 23. Electrical fields E1 and E2 are opposite in phase. Electrodes 25 and 27 are mechanically connected together and are positioned so that each moves in a different electrical field E1 or E2. More particularly, electrode 25 moves in a field E1 and electrode 27 moves in field E2. It is to be noted that electrical fields E1 and E2 are differentially directed with respect to the direction of displacement of electrodes 25 and 27. At some particular instant, when fields E1 and E2 are not zero, if electrodes 25 and 27 are positioned in the medial plane, or if electrodes 25 and 27 each comprise a pair of parallel conducting plates symmetrically disposed with respect to a medial plane, the potential of electrode 25 is the same as the potential of electrode 27 no matter what the instantaneous voltages across electrodes 19 and 21 and across electrodes 17 and 23 may be. If, however, electrodes 25 and 27 are moved—for example—in the direction toward plates 17 and 21 at some particular instant when the electrical fields E1 and E2 are not zero the potential of electrode 25 has a first polarity with respect to the potential it would have if it were in its neutral position and the potential of electrode 27 is opposite to that of electrode 25 with respect to the potential at the neutral position. Consequently, a voltage is generated between electrodes 25 and 27. With parallel plates, the potential distribution within fields E1 and E2 is, to a first order of magnitude, linearly distributed between electrodes 19 and 21 and linearly distributed between electrodes 17 and 23. Thus, the voltage between electrodes 25 and 27 is a measure of the displacement of electrodes 25 and 27 from the medial plane between electrodes 21 and 19 and between electrodes 17 and 23. The voltage at the input of impedance matcher 29 is sinusoidal with an amplitude which is a measure of the magnitude of the displacement of electrodes 25 and 27 from their neutral or zero-signal position. Impedance matcher 29 is desirable to isolate the interior of the capacitive portion of the device of this invention from the exterior circuitry so that capacitive effects in the exterior circuitry do not disturb the operation of the capacitive portion. The alternating output signal of impedance matcher 29 is channeled to the input of an amplifier 35 and demodulator 37. Demodulator 37 demodulates the signal to generate a direct voltage or signal whose polarity depends upon the direction of the deflection of electrodes 25 and 27 from their neutral or zero-signal position and whose amplitude is a measure of the amount of the deflection of electrodes 25 and 27 from their zero-signal position.

Referring now to FIG. 2, a direct voltage source 47 is connected across plates or electrodes 19 and 21 and across plates or electrodes 17 and 23 to generate a pair of electric fields E1 and E2. A pair of electrodes 25 and 27 are positioned within the electrical fields E1 and E2 and are mechanically connected to be displaced together. It is to be noted that electrical fields E1 and E2 are polarized differentially with respect to allowable motion of electrodes 25 and 27. The centertap between resistors 49 and 51 is connected to the centertap between resistors 43 and 45 to cause the potentials of electrodes 25 and 27 to be referenced to the voltage source 47. By making the resistance of resistor 49 equal the resistance of resistor 51 and the resistance of resistor 43 equal the resistance of resistor 45, the potential of electrode 27 is forced by voltage source 41 to be equal and opposite to the potential of electrode 25 relative to the centertap between resistors 43 and 45 and hence relative to the centertap between resistors 49 and 51. Although voltage source 41 is shown with its positive terminal connected to electrode 27, it is intended that the voltage of voltage source 41 should be variable not only in magnitude but also in polarity.

If electrodes 25 and 27 are deflected toward electrodes 21 and 17, a voltage applied by voltage source 41 with the polarity shown forces electrodes 25 and 27 back toward the medial plane between electrodes 19 and 21. If, however, electrodes 25 and 27 are deflected toward electrodes 19 and 23 the polarity of voltage source 41 must be reversed from the shown polarity to force electrodes 25 and 27 back into the medial or neutral position. As the electrodes move toward their medial or neutral position, it is desirable that the force continuously decrease in amplitude until electrodes 25 and 27 reach their neutral position. Otherwise, electrodes 25 and 27 overshoot and are electrically attracted to electrodes 17 and 21. Thus, it is desirable continuously to control the polarity and amplitude of voltage 41 to control the force upon electrodes 25 and 27.

In the device of FIG. 3, the force upon electrodes 25 and 27 is controlled both in sense and amplitude in response to the detected deflection of electrodes 25 and 27 from their neutral or no-signal position. When electrodes 25 and 27 tend to be deflected—for example—toward electrodes 17 and 21 (for example by an external force) a signal is generated between electrodes 25 and 27 by the alternating component of electrical fields E1 and E2. The signal generated between electrodes 25 and 27 is channeled through coupling condensers (or high pass filters) 31 and 33, and impedance matcher 29 to isolate the capacitive portion of the device of this invention from its external circuitry. The passed alternating signal is amplified and demodulated by amplifier 35 and demodulator 37 to generate an electrical signal, at the output of amplifier 35 and demodulator 37, which is a measure of the tendency of plates 25 and 27 to deflect from their neutral position. The resistances of resistors 57 and 59 are purposely made high relative to the impedance of coupling capacitor 31 and 33 at the frequency of alternation of alternators 53, 55, and 39. Thus resistors 57 and 59 form a low-pass filter circuit. The voltage or signal which appears across voltage dividing network of resistors 43 and 45 is connected through resistors 57 and 59 to plates 25 and 27. The output voltage of demodulator 37 is connected with the predetermined proper polarity and amplitude to generate a force on electrodes 25 and 27 which holds them substantially in their neutral position.

The amplitude of the signal at the output of demodulator 37 is servoed to increase to a value sufficient to counter externally applied force or force due to acceleration of the accelerometer. Thus, electrodes 25 and 27 are servoed to their neutral position. The output of demodulator 37 is a measure of the applied acceleration or force upon electrodes 25 and 27.

In the preferred operation of the device of this invention, electrodes 25 and 27 are associated with a mass such as—for example—the fused quartz portion of the moveable cantilevered member 87, to be responsive to changes in acceleration in a direction normal to the planes of the electrodes. The acceleration tends to deflect electrodes 25 and 27 which are then electrically forced back into their neutral position. The forcing voltage increases in amplitude so that the voltage or signal at the output of amplifier 35 or demodulator 37 is a linear measure of the acceleraiton applied to this device.

The amplitude of the voltage at the output of demodulator 37 is linearly related to the electrostatic force applied to electrodes 25 and 27.

With electrodes 25 and 27 centered between electrodes 21 and 19 and between 17 and 23, the electrostatic force between electrodes 21 and 25

$$F_1 = R_1(-V_1 - V_2 + V_3)^2$$

the electrostatic force between electrodes 17 and 27

$$F_2 = R_2(V_1 + V_2 - V_3)^2$$

the electrostatic force between electrodes 25 and 19

$$F_3 = R_3(V_1 + V_2 + V_3)^2$$

and the electrostatic force between electrodes 27 and 23

$$F_4 = R_4(-V_1 - V_2 - V_3)^2$$

With all electrodes alike, and with electrodes 25 and 27 centered, $$R_1 = R_2 = R_3 = R_4 = R$$

The net force on the electrodes 25 and 27 is:

$$F = F_1 + F_2 - F_3 - F_4$$
$$F = 8V_3 R(V_1 + V_2)$$

The frequency of $V_1$ is very high relative to the frequency of $V_3$. Further, the frequency of $V_1$ is very much greater than the natural mechanical frequency of the structure supporting electrodes 25 and 27. Consequently the $V_1 V_3 R$ term is not significant.

The device of this invention, then, is a novel accelerometer or force sensing device, the subcombinations of which may be utilized to measure a displacement, or to generate a force.

Although the device of this invention has been described particularly herein it is not intended that the description shall be limiting but only that the invention should be limited by the spirit and scope of the following claims in which we claim:

1. In combination:
first and second mechanically-connected electrodes displacable together in the direction of a predetermined axis;
means for generating a first electrical field intersecting said first electrode and a second electrical field intersecting said second electrode, said electrical fields being differentially polarized with respect to the direction of displacement of said electrodes.

2. In combination:
first and second mechanically-connected electrodes displacable together in the direction of a predetermined axis;
means for generating a first electrical field intersecting said first electrode and a second electrical field intersecting said second electrode, said fields being differentially polarized with respect to the direction of displacement of said electrodes;
and signal generating means connected to be responsive to voltages between said electrodes to generate an electrical signal which is a measure of said displacement of said electrodes from a predetermined position.

3. In combination:
first and second mechanically-connected electrodes adapted to be displaced along a predetermined axis from a predetermined neutral position;
means for generating a first electrical field intersecting said first electrode and a second electrical field intersecting said second electrode, said fields being differentially polarized with respect to the direction of displacement of said electrodes;
variable voltage means connected between said electrodes;
and means for electrically connecting said variable voltage means to said means for generating first and second electrical fields.

4. In combination:
first and second electrodes displacable together in the direction of a predetermined axis;
means for generating a first electrical field intersecting said first electrode and a second electrical field intersecting said second electrode, each of said fields having two separate frequency components, said electrical fields being differentially polarized with respect to the direction of allowable displacement of said electrodes;
first frequency selective means connected to said electrodes to separate the signals generated by said two frequency components and to pass signals of a first said frequency component and to reject signals of the second of said frequency components;
amplifying and demodulating means connected to be responsive to the output of said first frequency selective means to generate a signal at the frequency of said second frequency component;
second frequency selective means adapted to pass signals of the frequency of said second frequency component and to block signals of the frequency of said first frequency component, connected between the output of said demodulating means and said electrodes with a polarity to force said electrodes toward a predetermined position;
and electrical connecting means, connected between the output of said demodulating means and said means for generating electrical fields.

5. A device as recited in claim 4 in which said first frequency is higher than said second frequency and very much higher than the natural mechanical frequency of said electrodes.

6. In combination:
first and second mechanically-connected electrodes displacable together along a predetermined axis;
means for generating a first electrical field intersecting said first electrode and a second electrical field intersecting said second electrode, said electrical fields each having an alternating and a constant component and being differentially polarized with respect to the direction of allowable displacement of said electrodes from a predetermined position;
amplifying and demodulating means adapted to amplify and demodulate an alternating signal;
first frequency responsive means connected between said electrodes and the input to said amplifying and demodulating means and being adapted to pass only signal components in a high pass band which includes said alternating frequency;
second frequency responsive means connected between the output of said demodulating means and said electrodes and being adapted to pass only signal components on a low pass band which does not include said alternating frequency;
and electrical connecting means, connected between the output of said demodulator and said means for generating electrical fields.

7. In combination: means for generating a first electrical field; means for generating a second electrical field; first and second electrodes positioned in said first and second electrical fields, respectively, at a first position which causes no electrical potential difference between said electrodes; and mechanical means connected between said electrodes so that movement of one of said electrodes causes the other of said electrodes also to move relative to said first position so that when the potential of said first electrode is of a particular magnitude and polarity relative to its potential when in said first position, the potential of said second electrode relative to its potential when in said first position is equal in amplitude and opposite in polarity to the potential of said first electrode.

8. In combination: alternating voltage means for generating a first electrical field and for generating a second electrical field; first and second electrodes positioned in said first and second electrical fields, respectively, at a first position which causes zero electrical potential difference between said electrodes; mechanical means connected between said electrodes so that movement of one of said electrodes causes the other of said electrodes also to move relative to said first position so that when the potential of said first electrode is of particular magnitude and polarity relative to its potential when in said first position, the potential of said second electrodes relative to its potential when in said first position, is equal in amplitude and opposite in polarity to the potential of said first electrode; amplifying and demodulating means connected to said electrodes to amplify by a predetermined scale factor signals generated between said electrodes and to demodulate the amplified voltage to generate a voltage of a second frequency.

9. In combination: alternating and direct voltage means for generating first and second electrical fields each having a constant and alternating component; first and second electrodes positioned in said first and second electrical fields, respectively, at a first position which causes zero electrical potential difference between said electrodes; mechanical means connected to said electrodes so that movement of one of said electrodes causes the other of said electrodes also to move relative to said first position so that when the potential of said first electrode is of a particular magnitude and polarity relative to its potential when in said first position, the potential of said second electrode relative to its potential when in said first position is equal in amplitude and opposite in polarity to the potential of said first electrode; amplifying and demodulating means adapted to amplify alternating voltages by a predetermined scaled factor and to demodulate the amplified voltage; a high pass filter network, adapted to pass only signals in a high pass band which includes the frequency of said alternating voltage means, connected between said electrodes and the input to said amplifying and demodulating means; electrical connecting means, connected between the output of said amplifying and demodulating means and said direct voltage means; a low pass filter network, adapted to pass only signals in a low pass band which does not include the frequency of said alternating voltage means, connected between the output to said amplifying and demodulating means and said electrodes, the output of said amplifying and demodulating means being of a polarity, amplitude, and frequency to cooperate with the constant field component to generate a force upon said electrodes to hold said electrodes substantially at said first position.

10. A device as recited in claim 9 and further comprising: mass means sensitive to acceleration, mechanically connected to said electrodes to tend to displace said electrodes relative to said electrical fields in response to applied acceleration along a predetermined axis which causes the voltage at the output of said amplifying and demodulating means to be a measure of acceleration, the frequency of said alternating voltage means being sufficiently above the natural mechanical frequency of said mass to eliminate excitation of said natural frequency by said alternating voltage means.

11. A device as recited in claim 10 and further comprising: an impedance matcher, connected at its input end to said high pass filter and at its output end to said amplifying and demodulating means.

12. A device as recited in claim 10 and further comprising: force means, mechanically connected to said electrodes so that when one of said electrodes moves, the second said electrode is caused also to move in response to applied force and to cause the voltage at the output of said amplifying and demodulating means to be a measure of said applied force.

13. In combination: first and second capacitive electrodes disposed in parallel relationship with respect to each other and facing each other; a third capacitive electrode disposed between said first and second electrodes and in parallel relationship thereto; fourth and fifth capacitive electrodes disposed in parallel relation with respect to each other and facing each other; a sixth capacitive electrode disposed between said fourth and fifth electrodes and in parallel relationship thereto; said sixth capacitive electrode mechanically connected to said third capacitive electrode; said third and sixth capacitive electrodes being deflectable in the same sense relative to said first, second, fourth and fifth capacitive electrodes: alternating current means connected to generate an alternating field between said first and second capacitive electrodes and to generate an alternating field of opposite sense between said fourth and fifth capacitive electrodes; electrical connections to said third and sixth capacitive electrodes to generate a signal which indicates the difference in electrical potential between said third and sixth capacitive electrodes; and means connected to be responsive to said signal generated on said electrical connections to restore said third and sixth capacitive electrodes to a position of equal potential.

14. A device as recited in claim 13 in which said third and sixth capacitive electrodes are adapted to be deflected under the influence of applied acceleration.

15. A capacitive device, operative in a coordinate system defined by first and second displaced apart parallel planes, a third plane parallel to said first and second planes and medially positioned between them, and a fourth plane normal to said first, second, and third planes, said capacitive device comprising: first and second coplanar electrodes in said first plane symmetrically positioned with respect to said fourth plane at a predetermined first distance and a predetermined first orientation with respect to said fourth plane, third and fourth coplanar electrodes in said second plane, symmetrically positioned with respect to said fourth plane at a predetermined second distance and with a predetermined second orientation; fifth and sixth coplanar electrodes parallel to said third plane and symmetrically positioned with respect to said third and fourth planes; and means for allowing said fifth and sixth electrodes to deflect in either direction from said third plane and substantially parallel to said fourth plane.

16. A capacitive device, operative in a coordinate system defined by first and second displaced parallel planes, a third plane parallel to said first and second plane and medially positioned between them, and a fourth plane normal to said first, second, and third planes, said capacitive device comprising: first and second coplanar electrodes in said first plane, symmetrically positioned with respect to said fourth plane at a predetermined first distance and a predetermined first orientation with respect to said fourth plane, third and fourth coplanar electrodes in said second plane symmetrically positioned with respect to said fourth plane at a predetermined second distance and with a predetermined second orientation; fifth and sixth coplanar electrodes parallel to said third plane and symmetrically positioned with respect to said third and fourth planes; the spacing between said first and third planes and between said second and third planes being of the order of one one-hundredth of the dimensions of said first, second, third, fourth, fifth, and sixth electrodes; and means for allowing said fifth and sixth electrodes to deflect in either direction from said third plane and substantially parallel to said fourth plane.

17. A capacitive device, operative in a coordinate system defined by first and second displaced parallel planes, a third plane parallel to said first and second planes and medially positioned between them, and a fourth plane normal to said first, second, and third planes, said capacitive device comprising: first and second identically shaped coplanar electrodes in said first plane, symmetrically positioned at a predetermined first distance and at a predetermined first orientation with respect to said fourth plane; third and fourth coplanar electrodes, identically shaped with said first and second coplanar electrodes, in said second plane, symmetrically positioned at a predetermined second distance and with a predetermined second orientation with respect to said fourth plane; fifth and sixth identically shaped coplanar electrodes positioned parallel to said third plane and symmetrically positioned at a predetermined second distance and with a predetermined second orientation with respect to said fourth plane; fifth and sixth identically shaped coplanar electrodes positioned parallel to said third plane and symmetrically positioned with respect to said third and fourth planes; and means for allowing said fifth and sixth electrodes to deflect in either direction from said third plane and substantially parallel to said fourth plane.

18. A capacitive device, operative in a coordinate system defined by first and second displaced parallel planes, a third plane parallel to said first and second planes and medially positioned between them, and a fourth plane normal to said first, second, and third planes, said capacitive device comprising: first and second identical coplanar electrodes in said first plane, symmetrically positioned at a predetermined first distance and a predetermined first orientation with respect to said fourth plane; third and fourth coplanar electrodes identical to said first and fourth electrodes, positioned in said second plane, symmetrically positioned with respect to said fourth plane with said fourth electrode on the opposite side of said fourth plane from said first electrode, said third and fourth electrodes at a predetermined second distance and a predetermined second orientation with respect to said fourth plane; fifth and sixth identical coplanar electrodes parallel to said third plane and symmetrically positioned with respect to said third and fourth planes; means for allowing said fifth and sixth electrodes to deflect in either direction from said third plane and substantially parallel to said fourth plane; and first alternating voltage means having a first frequency, connected by one terminal to said first and fourth electrodes and by the other terminal to said second and third electrodes.

19. A device as recited in claim 18 in which said fifth and sixth electrodes are rigidly attached to remain coplanar and are displaced toward said first plane a third distance from said third plane and further comprising: seventh and eighth electrodes, identical in shape and aligned with said fifth and sixth electrodes, respectively, displaced toward said second plane said second distance from said third plane; impedance matching means, amplifying means, and demodulating means connected to said fifth, sixth, seventh, and eighth electrodes to generate a signal which is a measure of the position of said fifth, sixth, seventh and eighth electrodes and whose polarity is a measure of the direction of deflection of said fifth, sixth, seventh and eighth electrodes from a neutral position.

20. A capacitive device, operating in a coordinate system defined by first and second displaced parallel planes, a third plane parallel to said first and second planes and medially positioned between them, and a fourth plane normal to said first, second, and third plane, said capacitive device comprising: first and second identical coplanar electrodes, symmetrically positioned in said first plane at a predetermined first distance and a predetermined first orientation with respect to said fourth plane; third and fourth coplanar electrodes, identical to said first and second electrodes, symmetrically positioned in said second plane with said first orientation and at said first distance with respect to said fourth plane; fifth and sixth identical coplanar electrodes, parallel to said third plane, displaced toward said first plane by a predetermined second distance, having said first orientation and symmetrically positioned with respect to said fourth plane, seventh and eighth identical coplanar electrodes parallel to said third plane and displaced toward said second plane by said second predetermined distance, having said first predetermined orientation and symmetrically disposed with respect to said fourth plane; means for allowing said fifth, sixth, seventh and eighth electrodes to deflect in either direction from said third plane and substantially parallel to said fourth plane; a mass attached to said fifth, sixth, seventh and eighth electrodes and positioned to be sensitive to acceleration in a predetermined direction; said first and fourth electrodes being positioned upon opposite sides of said fourth plane; an alternating voltage means having a first frequency which is substantially greater than the natural mechanical frequency of said mass and said fifth, sixth, seventh and eighth electrodes; a direct voltage means connected in series with said alternating voltage means, said series connection being connected by one terminal to said first and fourth electrodes and by the other terminal to said second and third electrodes; impedance matching means, amplifying means, and demodulating means connected to said fifth, sixth, seventh and eighth electrodes to generate a signal which is a measure of the tendency of said fifth, sixth, seventh and eighth electrodes to deflect; voltage connecting means connected between the output of said demodulating means and said direct voltage means; a high pass filter circuit connected between said fifth, sixth, seventh and eighth electrodes and said impedance matching means, adapted to pass a high frequency band including the frequency of said alternating voltage source; a low pass filter circuit, adapted to pass a low frequency band which does not include the frequency of said alternating voltage source, connected between the output of said demodulator and said fifth, sixth, seventh and eighth electrodes with a polarity to interact with the electric field component generated by said direct voltage means to cause force to be applied to said fifth, sixth, seventh and eighth electrodes in a sense to counter attempts to deflect said fifth, sixth, seventh and eighth electrodes from their neutral position.

References Cited by the Examiner

UNITED STATES PATENTS

| | | | |
|---|---|---|---|
| 2,025,719 | 12/1935 | Blau et al. | 72—517 |
| 2,498,118 | 2/1950 | Weiss | 73—516 |
| 2,916,279 | 12/1959 | Stanton | 73—517 |
| 2,968,952 | 1/1961 | Stalder. | |

RICHARD C. QUEISSER, *Primary Examiner.*

S. FEINBERG, SAMUEL BOYD, *Examiners.*